United States Patent Office 3,377,410
Patented Apr. 9, 1968

3,377,410
O,O-DI-LOWER ALKYL-S-[(p-LOWER ALKYLMER-CAPTO-PHENYL)-LOWER ALKOXYCARBONYL-METHYL]-DITHIOPHOSPHATES
Richard Sehring and Karl Zeile, Ingelheim am Rhine, Germany, assignors to C. H. Boehringer Sohn Ingelheim am Rhine, Germany, a limited partnership of Germany
No Drawing. Continuation of application Ser. No. 333,207, Dec. 24, 1963. This application Aug. 3, 1967, Ser. No. 658,294
Claims priority, application Germany, Jan. 4, 1963, B 70,221; Oct. 25, 1963, B 74,017, B 74,018
4 Claims. (Cl. 260—941)

This application is a continuation of S.N. 333,207, filed Dec. 24, 1963, now abandoned.

This invention relates to novel O,O-dialkyl-dithiophosphoric acid esters, as well as to pesticidal compositions comprising said novel compounds as active ingredients and to a pesticidal method.

More particularly, the present invention relates to novel O,O-di-lower alkyl-dithiophosphoric acid esters of the formula selected from the group consisting of

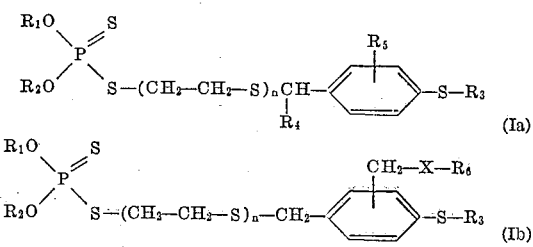

and

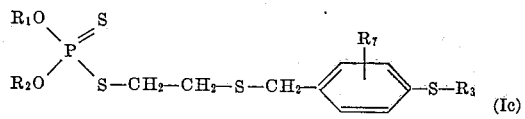

wherein $R_1$, $R_2$ and $R_3$ are each selected from the group consisting of alkyl of 1 to 3 carbon atoms,
$R_4$ is selected from the group consisting of alkyl of 1 to 3 carbon atoms, alkoxy of 1 to 3 carbon atoms, alkylmercapto of 1 to 3 carbon atoms and

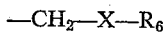

where A is alkyl of 1 to 4 carbon atoms,
$R_5$ is selected from the group consisting of hydrogen, alkyl of 1 to 3 carbon atoms and $$-CH_2-X-R_6$$

where X is selected from the group consisting of oxygen and sulfur, and
$R_6$ is alkyl of 1 to 3 carbon atoms,
$R_7$ is selected from the group consisting of hydrogen and alkyl of 1 to 3 carbon atoms, and $n$ is an integer from 0 to 1, inclusive.

The novel O,O-di-lower alkyl-dithiophosphoric acid esters embraced by the Formulae Ia–Ic above may be prepared by various methods which involve well known chemical principles. Most conveniently, however, they are prepared by reacting a salt, preferably an alkali metal salt, of an O,O-di-lower alkyl-phosphoric acid with a compound of the formula selected from the group consisting of

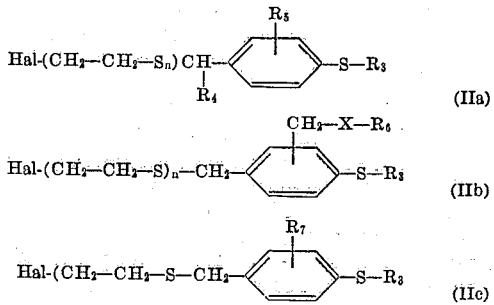

wherein Hal is a halogen, preferably chlorine or bromine, and $R_3$, $R_4$, $R_5$, $R_6$, $R_7$ and $n$ have the meanings defined above.

The following examples will further illustrate the present invention and enable others to understand it more completely. It should be understood, however, that the present invention is not limited to the particular examples given below.

EXAMPLE 1

Preparation of O,O-dimethyl-S-(3-ethoxymethyl-4-methylmercapto-benzyl)-dithiophosphate 13.5 gm. of sodium O,O-dimethyl-dithiophosphate were dissolved in 50 cc. of methyl isobutyl ketone, and the resulting solution was admixed dropwise with 14 gm. of 3-ethoxymethyl-4-methylmercapto-benzyl chloride at 60–70° C., accompanied by stirring. The reaction mixture was then stirred at 70–75° C. for about four hours, whereupon the reaction had gone to completion. The sodium chloride which had separated out during the reaction was separated by vacuum filtration, the filtrate was evaporated in vacuo, and the residue was taken up in 50 cc. of ether. The ethereal solution was then washed by shaking with 50 cc. of water, dried and evaporated in vacuo. The residue was then freed from residual volatile components by heating it on a boiling water bath at a pressure of 0.2 mm. Hg, 17 gm. of a non-distillable oil remained behind, which was identified to be O,O-dimethyl-S-(3-ethoxymethyl-4-methylmercapto-benzyl)-dithiophosphate of the formula

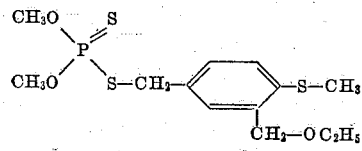

The yield was 80% of theory.
Analysis.—Phosphorus—calculated, 8.82%; found, 8.70%. Sulfur—calculated, 27.3%; found, 27.15%.

EXAMPLE 2

Preparation of O,O-dimethyl-S-[(4-methylmercapto-benzyl)-mercaptoethyl]-dithiophosphate 20 gm. of sodium O,O-dimethyl-dithiophosphate were dissolved in 60 cc. of methyl isobutyl ketone, and the resulting solution was admixed dropwise at 60–70° C. with 23 gm. of 4-methylmercapto-benzyl-β-chlorethyl-thioether. The reaction mixture was then stirred for about four hours at 70–75° C., whereupon the reaction had gone to completion. The sodium chloride which had precipitated during the reaction was separated by vacuum filtration, the filtrate was evaporated in vacuo, and the residue was taken up in 50 cc. of benzene. The benzene solution was then washed by shaking it with 50 cc. of water, dried, and the benzene was distilled off in vacuo. 28 gm. of a non-distillable oil remained behind, which was identified to be O,O-dimethyl-S-[(4-methylmercapto - benzyl - mercaptoethyl]-dithiophosphate of the formula

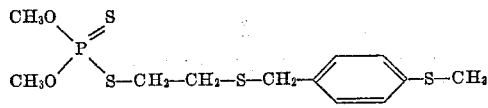

The yield was 79.0% of theory.

Analysis.—Phosphorus—calculated, 8.76%; found, 8.54%. Sulphur—calculated, 36.1%; found, 36.0%.

EXAMPLE 3

Preparation of O,O - diethyl - S - [(p - methylmercapto-phenyl)-ethoxycarbonyl-methyl]-dithio-phosphate 13. gm. of sodium O,O-diethyl-dithiophosphate were dissolved in 40 cc. of methylisobutyl ketone, and the resulting solution was slowly admixed with 10 gm. of (p-methylmercapto - phenyl) - ethoxycarbonyl - methyl chloride at 60° C., accompanied by stirring. The reaction mixture was then stirred for about five hours at 80–85° C., after which the reaction had gone to completion. The sodium chloride which had precipitated during the reaction was separated by vacuum filtration, the filtrate was evaporated in vacuo, and the residue was taken up in methylenechloride. The methylenechloride solution was then washed by shaking two times with 15 cc. of water, dried and evaporated in vacuo. The residue was then freed from residual volatile components by heating it on a boiling water bath at a pressure of 0.2 mm. Hg.

16.3 gm. of a non-distillable oil remained behind, which was identified to be O,O-diethyl-S-[(p-methylmercapto-phenyl) - ethoxycarbonyl - methyl] - dithiophosphate of the formula

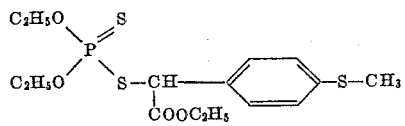

The yield was 100% of theory.

Analysis.—Phosphorus—calculated, 7.87%; found, 7.75%. Sulfur—calculated, 24.35%; found, 24.30%.

EXAMPLE 4

Using a procedure analogous to that described in Example 1, O,O-dimethyl-S-[(p-methylmercapto - phenyl)-methylmercapto-methyl]-dithiophosphate of the formula

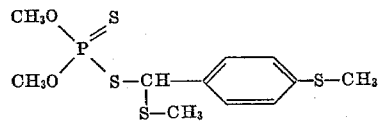

was prepared from sodium O,O-dimethyl-dithiophosphate and (p-methylmercapto-phenyl)-methylmercapto - methyl chloride. The product was a non-distillable oil.

Analysis.—Phosphorus—calculated, 9.12%; found, 9.07%. Sulfur—calculated, 37.05%; found, 37.10%.

EXAMPLE 5

Using a procedure analogous to that described in Example 1, O,O-dimethyl-S-[(p - methylmercapto - phenyl)-ethoxy-methyl]-dithiophosphate of the formula

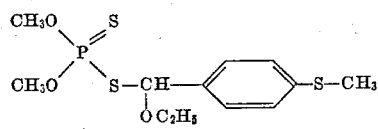

was prepared from sodium O,O-dimethyl-dithiophosphate and (p-methylmercapto-phenyl)-ethoxy-methyl chloride. The product was a non-distillable oil.

Analysis.—Phosphorus—calculated, 9.17%; found, 9.20%. Sulfur—calculated, 28.18%; found, 28.25%.

EXAMPLE 6

Using a procedure analogous to that described in Example 3, O,O-dimethyl-S-[( p- methylmercapto - phenyl)-ethoxycarbonyl-methyl]-dithiophosphate of the formula

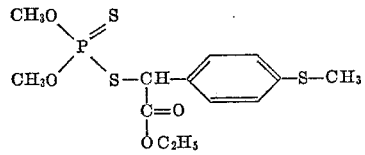

was prepared from sodium O,O-dimethyl-dithiophosphate and (p-methylmercapto-phenyl)-ethoxycarbonyl - methyl chloride.

The product was a non-distillable oil.

Analysis.—Phosphorus—calculated, 8.47%; found, 8.32%. Sulfur—calculated, 26.22%; found, 26.37%.

EXAMPLE 7

Using a procedure analogous to that described in Example 3, O,O-dimethyl-S-[(p-methylmercapto-phenyl)-isopropoxycarbonyl-methyl]-dithiophosphate of the formula

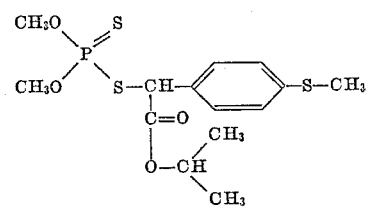

from sodium O,O - dimethyl - dithiophosphate and (p-methylmercapto - phenyl) - isopropoxycarbonyl - methyl chloride.

The product was a non-distillable oil.

Analysis.—Phosphorus—calculated, 8.15%; found, 8.10%. Sulfur—calculated, 25.24%; found, 25.30%

EXAMPLE 8

Using a procedure analogous to that described in Example 1, O,O-diethyl-S-[1-(p-methylmercapto-phenyl)-ethyl-1]-dithiophosphate of the formula

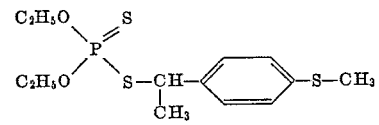

was prepared from sodium O,O-diethyl-dithiophosphate and 1-(p-methylmercapto-phenyl)-ethyl-1 chloride. The product was a non-distillable oil.

Analysis.—Phosphorus—calculated, 9.23%; found, 9.10%. Sulfur—calculated, 28.58%; found, 28.65%.

EXAMPLE 9

Using a procedure analogous to that described in Example 1, O,O-dimethyl-S-[(p-methylmercapto-phenyl)-ethylmercapto-methyl]-dithiophosphate of the formula

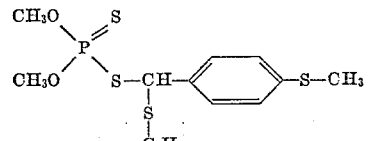

was prepared from sodium O,O-dimethyl-dithiophosphate and (p - methylmercapto - phenyl)-ethylmercapto-methyl chloride. The product was a non-distillable oil.

Analysis.—Phosphorus—calculated, 8.75%; found, 8.60%. Sulfur—calculated, 36.20%; found, 36.35%.

EXAMPLE 10

Using a procedure analogous to that described in Example 2, O,O-diethyl - S - [(p-methylmercapto-benzyl)-mercaptoethyl]-dithiophosphate of the formula

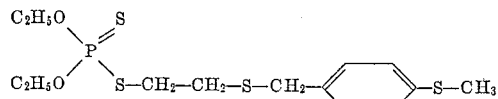

was prepared from sodium O,O-diethyl-dithiophosphate and 4-methylmercapto-benzyl-β-chloroethylthio ether. The product was a non-distillable oil.

Analysis.—Phosphorus—calculated, 8.12%; found, 8.01%. Sulfur—calculated, 33.55%; found, 33.40%.

EXAMPLE 11

Using a procedure analogous to that described in Example 2, O,O-dimethyl-S-[(3-methyl-4-methylmercapto-benzyl)-mercaptoethyl]-dithiophosphate of the formula

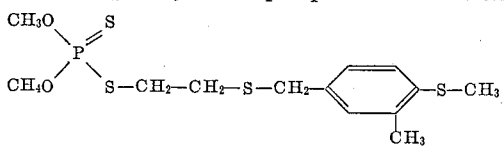

was prepared from sodium O,O-dimethyl-dithiophosphate and (3-methyl-4-methylmercapto-benzyl)-β-chloroethylthio ether. The product was a non-distillable oil.

Analysis.—Phosphorus—calculated, 8.43%; found, 8.29%. Sulfur—calculated, 34.80%; found, 34.70%.

EXAMPLE 12

Using a procedure analogous to that described in Example 2, O,O-dimethyl - S - [p-ethylmercapto-benzyl)-mercaptoethyl]-dithiophosphate of the formula

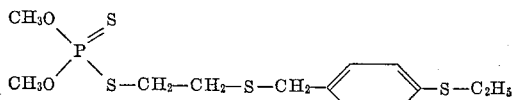

was prepared from sodium O,O-dimethyl-dithiophosphate and (p-ethylmercapto-benzyl) - β - chloroethylthio ether. The product was a non-distillable oil.

Analysis.—Phosphorus—calculated, 8.43%; found, 8.30%. Sulfur—calculated, 34.80%; found, 34.90%.

EXAMPLE 13

Using a procedure analogous to that described in Example 3, O,O-dimethyl-S-[(p-methylmercapto-phenyl)-ethoxycarbonyl - methylmercapto - ethyl]-dithiophosphate of the formula

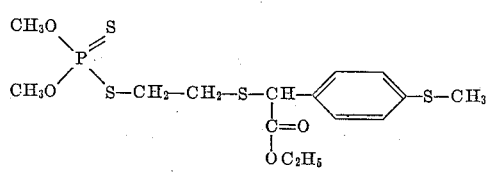

was prepared from sodium O,O-dimethyl-dithiophosphate and (p-methylmercapto-phenyl)-ethoxycarbonyl-methyl-β-chloroethylthio ether. The product was a non-distillable oil.

Analysis.—Phosphorus—calculated, 7.28%; found, 7.29%. Sulfur—calculated, 30.00%; found, 29.90%.

EXAMPLE 14

Using a procedure analogous to that described in Example 1, O,O-diethyl-S-(3-ethoxymethyl-4-methylmercapto-benzyl)-dithiophosphate of the formula

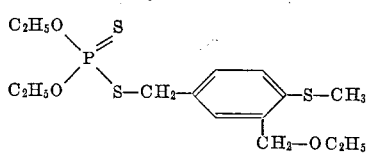

was prepared from sodium O,O-diethyl-dithiophosphate and 3-ethoxymethyl-4-methylmercapto-benzyl chloride. The product was a non-distillable oil.

Analysis.—Phosphorus—calculated, 8.16%; found, 8.09%. Sulfur—calculated, 25.22%; found, 25.35%

EXAMPLE 15

Using a procedure analogous to that described in Example 1, O,O-diethyl-S-(3-methoxymethyl - 4-ethylmercapto-benzyl)-dithiophosphate of the formula

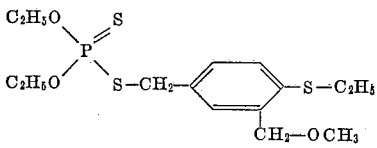

was prepared from sodium O,O-diethyl-dithiophosphate and 3-methoxymethyl - 4-ethylmercapto-benzyl chloride. The product was a non-distillable oil.

Analysis.—Phosphorus—calculated, 8.16%; found, 8.03%. Sulfur—calculated, 25.22%; found, 25.40%.

EXAMPLE 16

Using a procedure analogous to that described in Example 1, O,O-diethyl-S-(3-isopropoxymethyl - 4-methylmercapto-benzyl)-dithiophopshate of the formula

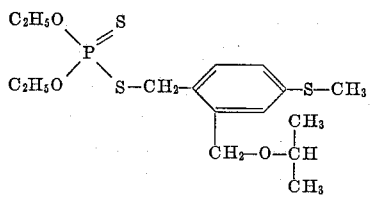

was prepared from sodium O,O-diethyl-dithiophosphate and 3-isopropoxymethyl - 4-methylmercapto-benzyl chloride. The product was a non-distillable oil.

Analysis.—Phosphorus—calculated 7.86%; found 7.75%. Sulfur—calculated, 24.39%; found, 24.50%.

EXAMPLE 17

Using a procedure analogous to that described in Example 1, O,O-diethyl - S-(3 - methylmercaptomethyl - 4-methylmercapto-benzyl)-dithiophosphate of the formula

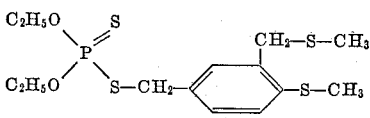

was prepared from sodium O,O-diethyl-dithiophosphate and 3-methylmercaptomethyl - 4-methylmercapto-benzyl chloride. The product was a non-distillable oil.

Analysis.—Phosphorus—calculated, 8.12%; found, 8.0.% Sulfur—calculated, 33.52%; found, 33.75%.

EXAMPLE 18

Using a procedure analogous to that described in Example 3, O,O-diethyl-S-[(3-ethoxymethyl - 4-methylmercapto-phenyl)-ethoxycarbonyl-methyl]-dithiophosphate of the formula

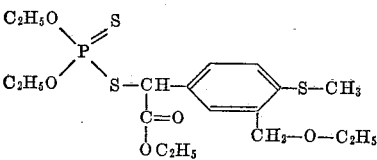

was prepared from sodium O,O-diethyl-dithiophosphate and (3-ethoxymethyl - 4 - methylmercapto-phenyl)-ethoxycarbonyl-methyl chloride. The product was a non-distillable oil.

Analysis.—Phosphorus—calculated, 6.85%; found, 6.67%. Sulfur—calculated, 21.22%; found 21.35%.

EXAMPLE 19

Using a procedure analogous to that described in Example 1, O,O-dimethyl-S-[(3-ethoxymethyl-4-methylmercapto-benzyl)-mercaptoethyl]-dithiophosphate of the formula

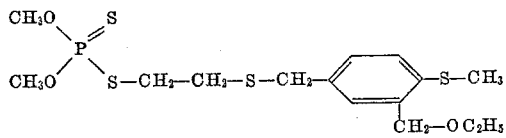

was prepared from sodium O,O-dimethyl-dithiophosphate and (3-ethoxymethyl-4-methylmercapto-benzyl)-β-chloroethylthio ether. The product was a non-distillable oil.

Analysis.—Phosphorus—calculated, 7.53%; found, 7.41%. Sulfur—calculated, 31.00; found, 31.10%.

The novel compounds according to the present invention, that is, those embraced by the Formulae Ia–Ic above, are highly effective broad-spectrum pesticides; they act not only as contact poisons but also as alimentary canal poisons. Their toxicity toward warm-blooded animals is extremely low.

The novel O,O-dialkyl-dithiophosphate are particularly effective against red spider mites, aphids, weevils (Calandra), bedbugs (*Cimex lectularius*), roaches and the common housefly.

For pesticidal purposes the compounds according to the present invention are disseminated in the form of compositions consisting esentially of an inert carrier and a pesticidally effective amount of the active ingredient. The inert carrier may be a gaseous substance, such as a propellant gas, or a liquid or solid substance. In addition, the compositions may comprise one or more other inert additives, such as emulsifiers, extenders and substances which increase the adherence of the compositions to surfaces or objects to which they may be applied. The compounds of the present invention may be the sole active pesticidal ingredients in the compositions, or they may be combined with other pesticidal agents. Examples of suitable forms of such compositions are, among others: dusting powders, suspensions, emulsions, solutions, aerosols, fumigating paper or powder, and ointments.

The preferred concentration of the compounds according to the present invention in such pesticidal compositions is from 0.01 to 5% by weight.

The following examples illustrate various types of pesticidal composition comprising a compound of the present invention as the active ingredient.

EXAMPLE 20

Emulsion 40 gm. of O,O-diethyl-S-[(p-methylmercaptophenyl)-ethoxycarbonyl-methyl]-dithiophosphate, 20 gm. of xylene and 40 gm. of naphthalene sulfonate were emulsified in an amount of water sufficient to make the concentration of the dithiophosphate from 0.01 to 0.2% by weight, based on the overall weight of the emulsion.

This pesticidal emulsion is highly effective against red spider mites, weevils, bedbugs and roaches.

EXAMPLE 21

Suspension

A mixture of 25 gm. of O,O-diethyl-S-[(p-methylmercapto-phenyl)-ethoxycarbonyl-methyl]-dithiophosphate, 5 gm. of naphthalene sulfonate and 20 gm. of kaoline was milled, and the resulting intimate mixture was suspended in an amount of water sufficient to make the concentration of the dithiophosphate from 0.01 to 0.2% by weight, based on the overall weight of the suspension.

The pesticidal suspension was also highly effective against red spider mites, weevils, bedbugs and roaches.

EXAMPLE 22

Dusting powder 2 gm. of O,O-diethyl-S-[(p-methylmercapto-phenyl)-ethoxycarbonyl-methyl]-dithiophosphate and 98 gm. of kaolin were admixed and milled until a homogenous powder was obtained.

The dusting powder, comprising 2% of the pesticidal ingredient, was also very effective in combating red spider mites, weevils, bedbugs and roaches.

EXAMPLE 23

Aerosol 5 parts by weight of O,O-diethyl-S-[(p-methylmercapto-phenyl)-ethoxycarbonyl-methyl]-dithiophosphate were dissolved in 95 parts by weight of a difluorodichloromethane, and the solution was filled into aerosol cans at reduced temperature or under pressure.

The aerosol spray thus obtained, comprising 5% by weight of the dithiophosphate, was highly effective against red spider mites, weevils, bedbugs, and roaches.

As pointed out above, the compositions described in Examples 20 to 23 are merely illustrative. It should be understood that the particular dithiophosphate in those illustrative examples may be replaced by any of the other dithiophosphates embraced by the Formulae Ia–Ic above. Similarly, the concentration of the dithiophosphate component may be varied within the limits previously indicated, depending upon the requirements and conditions. Finally, the inert components of the illustrative compositions may be replaced by equivalent inert materials customarily used in the preparation of pesticidal emulsions, solutions, suspensions, dusting powders, aerosols and the like.

While the present invention has been illustrated with the of certain specific embodiments thereof, it will be readily apparent to others skilled in the art that the invention is not limited to these particular embodiments and that various changes and modifications may be made without departing from the spirit of the invention or the scope of the appended claims.

We claim:

1. A compound of the formula

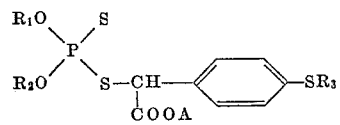

wherein
$R_1$, $R_2$ and $R_3$ are each alkyl of 1 to 3 carbon atoms, and
A is alkyl of 1 to 4 carbon atoms.

2. A compound according to claim 1, wherein $R_1$, $R_2$ and $R_3$ are methyl, and A is ethyl.

3. A compound according to claim 1, wherein $R_1$, $R_2$ and A are ethyl, and $R_2$ is methyl.

4. A compound according to claim 1, wherein $R_1$, $R_2$ and $R_3$ are methyl, and A is isopropyl.

References Cited

UNITED STATES PATENTS 3,076,009   1/1963   Schrader et al. _____ 260—941

CHARLES B. PARKER, *Primary Examiner.*

A. H. SUTTO, *Assistant Examiner.*

UNITED STATES PATENT OFFICE
CERTIFICATE OF CORRECTION

Patent No. 3,377,410                                                      April 9, 1968

Richard Sehring et al.

It is hereby certified that error appears in the above numbered patent requiring correction and that the said Letters Patent should read as corrected below.

Column 2, formula (IIa) should appear as shown below:

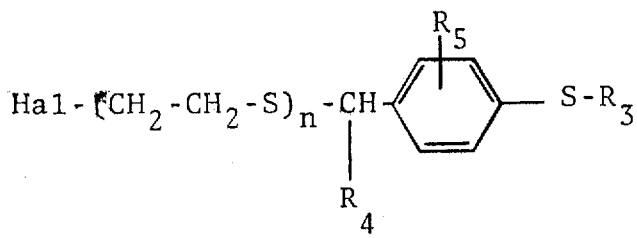

Column 5, line 64, "found, 7.29%" should read -- found, 7.20% --
Column 8, lines 47 to 50, the formula should appear as shown below:

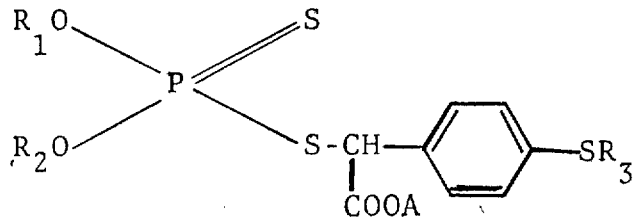

Signed and sealed this 12th day of August 1969.

(SEAL)
Attest:

EDWARD M. FLETCHER, JR.                          WILLIAM E. SCHUYLER, JR
Attesting Officer                                    Commissioner of Patents